(No Model.)
P. MEDART.
FRICTION CLUTCH.
No. 423,333. Patented Mar. 11, 1890.
*Fig. I.*
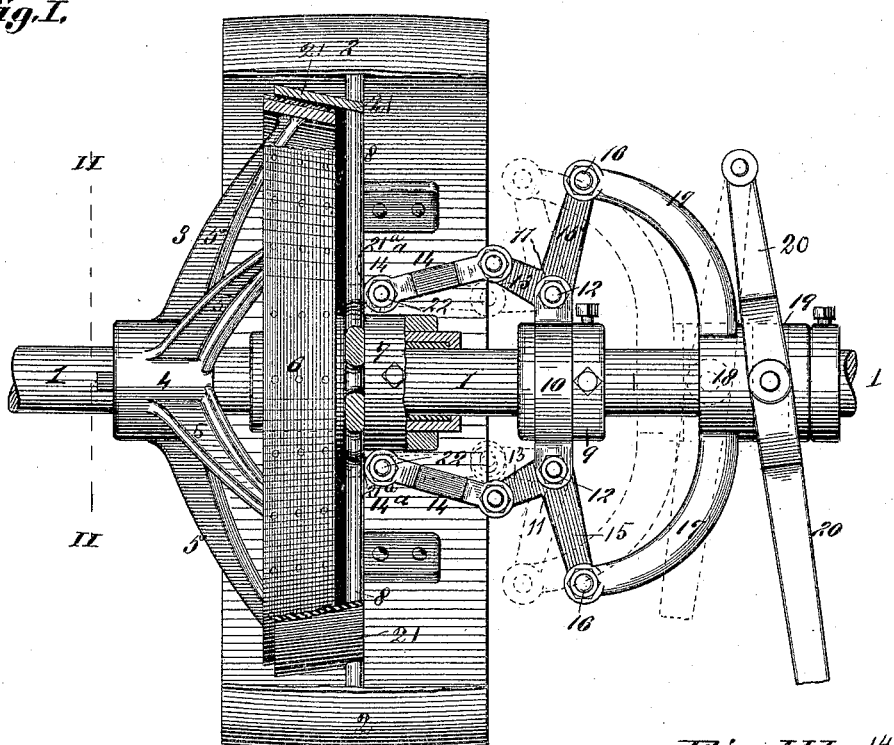
*Fig. II.*
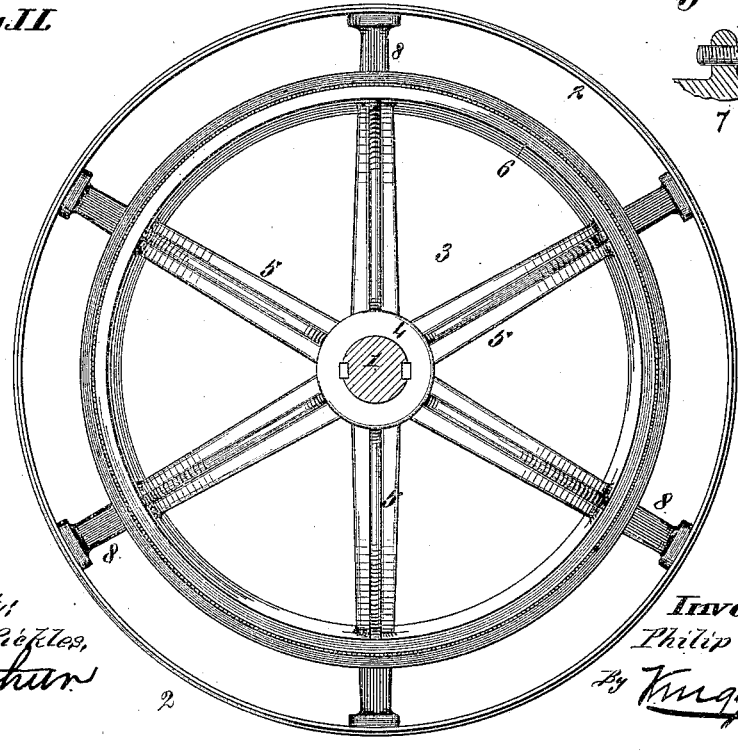
*Fig. III.*
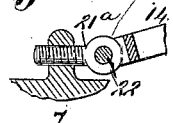
Attest:
Charles Peebles,
E. Arthur
Inventor:
Philip Medart
By Knight Bros
Atty's
N. PETERS, Photo-Lithographer, Washington, D.C.

UNITED STATES PATENT OFFICE.

PHILIP MEDART, OF ST. LOUIS, MISSOURI, ASSIGNOR OF ONE-HALF TO WILLIAM MEDART, OF SAME PLACE.

FRICTION-CLUTCH.

SPECIFICATION forming part of Letters Patent No. 423,333, dated March 11, 1890.

Application filed August 5, 1889. Serial No. 319,709. (No model.)

*To all whom it may concern:*

Be it known that I, PHILIP MEDART, of the city of St. Louis, in the State of Missouri, have invented a certain new and useful Improvement in Friction-Clutches, of which the following is a full, clear, and exact description, reference being had to the accompanying drawings, forming a part of this specification.

My invention relates to certain improvements in friction-clutches, the construction being such that the mechanism employed for shifting the movable member of the clutch (with the exception of the operating-lever) is carried by the clutch on the shaft, the result being a much more effective and an easier operation of the parts, as well as less wear and tear on the parts.

My invention consists in features of novelty hereinafter fully described, and pointed out in the claims.

Figure I is an elevation, part in section, illustrating my improved clutch. Fig. II is a section taken on line II II, Fig. I. Fig. III is a detail view.

1 represents the shaft; 2, the pulley.

3 represents the fixed member of the clutch, keyed or otherwise secured to the shaft 1, and consisting, preferably, of the hub 4, the arms 5, and a rim 6. The pulley has a hub 7 loosely mounted on the shaft 1 and connected by arms 8 to the rim.

9 represents a collar rigidly secured to the shaft 1 a short distance from the pulley and grooved to receive a ring 10.

11 represents bell-crank levers pivoted to the ring 10 at 12. The inner arms 13 of the levers are connected by links 14 to the hub or arms of the pulley, and the outer arms 15 of the levers are connected at 16 to horns 17, projecting from the collar 18, loosely mounted on the shaft 1. The collar 18 is grooved to receive a ring 19, to which the operating-lever 20 is connected.

The operation is as follows: When the parts are in the position shown in full lines in Fig. I, the clutch is disengaged, or is in its inoperative position. By moving the lever and shifting the parts from the position shown in full lines in Fig. I to the position shown in dotted lines a flange 21 on the pulley which forms the movable member of the clutch is brought into frictional contact with the rim 6 of the fixed member 3 of the clutch, and the pulley is thus connected to the shaft and the latter made to revolve with the pulley. In moving the lever as stated, the horns 17 force the outer ends of the bell-crank levers 15 toward the pulley. This forces the joints between the inner ends of the levers and the links 14 inward, producing a toggle movement, which with great pressure forces the movable member of the clutch or the pulley toward the fixed member of the clutch. The parts are so disposed that when they reach the position shown in dotted lines, Fig. I, the joints (between the outer ends of the links 14 and the inner ends of the bell-crank levers) are inside of a line drawn from the pivots 12 of the levers to the pivots 14$^a$ of the inner ends of the links, and thus the clutch is made self-locking, so that no pressure is brought to bear on the operating-lever when the clutch is engaged, and likewise none on the collar 18 or its horns 17, the pressure being removed to the fixed collar 9, which takes all the strain when the clutch is at work, and from the fact that the collar 9 and the connecting parts between the collar and the clutch revolve with the clutch and pulley, and from the further fact that there is no strain or pressure between the collar 18 and the operating-lever 20, (one of which revolves and the other remains still,) there is practically little or no wear to the operating parts of a clutch thus constructed.

To afford an adjustment of the links as the bearing-surface between the fixed member and the loose member of the clutch wears (so that a uniform pressure may be maintained when the parts are moved to working position) I connect the inner ends of the links 14 to the arms or hub of the pulley, as shown in Fig. III—that is, by means of screw-eyes 21$^a$, fitting in the pulley or movable member of the clutch and connected to the links 14 by means of bolts 22. It will be understood that by removing the bolts 22 and turning inward or outward on the screw-eyes the length of the links may be increased or diminished at will, and thus a perfect adjustment of the parts may be easily had for the purpose stated.

The links 14, acting in connection with the inner arms of the bell-crank levers, form toggles, and in the claims I have referred to these parts as "toggles."

I claim as my invention—

1. In a friction-clutch, the combination of a fixed member secured to a shaft, a movable member, a ring held from longitudinal movement on the shaft, but allowed to turn therewith, toggles connecting the ring to the movable member of the clutch, a sliding collar loosely mounted on the shaft, and connection between said collar and the toggles, whereby the latter are operated and moved beyond their centers, substantially as and for the purpose set forth.

2. In a friction-clutch, the combination of a fixed member secured to the shaft, a movable member, a ring mounted on the shaft, toggles connecting the ring to the movable member of the clutch, adjustable connection between the inner ends of the toggles and the movable member of the clutch, a movable collar provided with an operating-lever, and connection between the collar and the toggles, substantially as and for the purpose set forth.

3. In a friction-clutch, the combination of the fixed member, the movable member, a ring, bell-crank levers pivoted to the ring, links connecting the inner ends of the bell-crank levers to the movable member of the clutch and forming toggle-joints, and movable collar to which the operating-lever is connected, and horns on the collar connected to the outer arms of the bell-crank levers, substantially as and for the purpose set forth.

4. In a friction-clutch, the combination of a fixed member, a movable member, a ring, bell-crank levers pivoted to the ring, links pivoted to the inner ends of the bell-crank levers, adjustable screw-eyes connecting the inner ends of the links to the movable member of the clutch, a collar, and horns on the collar connected to the outer ends of the bell-crank levers, substantially as and for the purpose set forth.

PHILIP MEDART.

In presence of—
E. S. KNIGHT,
THOS. KNIGHT.